(12) United States Patent
Becker et al.

(10) Patent No.: US 10,772,252 B2
(45) Date of Patent: Sep. 15, 2020

(54) MIDDLE BREAKER FOR A TILLAGE IMPLEMENT

(71) Applicant: Deere & Company, Moline, IL (US)

(72) Inventors: Shawn J. Becker, Centralia, KS (US); David L. Steinlage, Centralia, KS (US); Mark D. Beeck, Ankeny, IA (US); Andrew J. Peterson, Ankeny, IA (US); John W. Gisler, Ankeny, IA (US); Narayanan E. Esakkimuthu, Pune (IN)

(73) Assignee: DEERE & COMPANY, Moline, IL (US)

( * ) Notice: Subject to any disclaimer, the term of this patent is extended or adjusted under 35 U.S.C. 154(b) by 232 days.

(21) Appl. No.: 16/009,291

(22) Filed: Jun. 15, 2018

(65) Prior Publication Data
US 2019/0380251 A1 Dec. 19, 2019

(51) Int. Cl.
*A01B 5/08* (2006.01)
*A01B 15/16* (2006.01)
*A01B 49/02* (2006.01)
*A01B 63/00* (2006.01)
*A01B 73/04* (2006.01)

(52) U.S. Cl.
CPC ............ *A01B 5/08* (2013.01); *A01B 15/16* (2013.01); *A01B 49/027* (2013.01); *A01B 63/002* (2013.01); *A01B 73/044* (2013.01)

(58) Field of Classification Search
CPC ....... A01B 63/002; A01B 73/044; A01B 5/08; A01B 5/04; A01B 5/16; A01B 15/16; A01B 49/027; A01B 21/08; A01B 21/083; A01B 21/086
See application file for complete search history.

(56) References Cited

U.S. PATENT DOCUMENTS

| 338,176 | A | * | 3/1886 | La Dow | A01B 49/027 172/142 |
| 1,380,441 | A | | 6/1921 | Truman | |
| 3,845,825 | A | | 11/1974 | Boone et al. | |
| 4,180,135 | A | * | 12/1979 | Birkenbach | A01B 21/083 172/398 |
| 4,785,891 | A | * | 11/1988 | Noland | A01B 13/025 172/185 |

(Continued)

OTHER PUBLICATIONS

European Search Report for European Patent Application No. EP 19178285.3 dated Nov. 11, 2019 in 9 pages.

*Primary Examiner* — Jessica H Lutz

(57) ABSTRACT

A tillage implement having a frame member extending in a fore-aft direction of the implement, the frame member pivotally connected in a foldable configuration, the frame member comprising a main frame section; a first wing section and a second wing section, each being pivotally connected at opposing lateral sides of the main frame section in the fore-aft direction; and a middle breaker including a first disc coupled to the main frame section, the first disc laterally offset from a centerline of the middle breaker extending in the fore-aft direction, the first disc having a concave side facing towards the centerline, and a second disc coupled to the main frame section, laterally offset from the centerline of the middle breaker, the second disc having a concave side facing towards the centerline.

18 Claims, 6 Drawing Sheets

(56) References Cited

U.S. PATENT DOCUMENTS

| | | | | |
|---|---|---|---|---|
| 5,462,123 | A | * | 10/1995 | Harlan .................. A01B 63/32 |
| | | | | 172/454 |
| 5,669,452 | A | | 9/1997 | Wright et al. |
| 9,313,937 | B2 | | 4/2016 | Gray et al. |
| 2010/0314144 | A1 | * | 12/2010 | Hennes ................ A01B 21/083 |
| | | | | 172/178 |
| 2011/0284253 | A1 | | 11/2011 | Stevenson |
| 2014/0262363 | A1 | * | 9/2014 | Gray .................. A01B 21/083 |
| | | | | 172/1 |
| 2018/0199497 | A1 | * | 7/2018 | Roberge ............... A01B 49/027 |
| 2019/0059197 | A1 | * | 2/2019 | Ankenman .......... A01B 29/048 |

\* cited by examiner

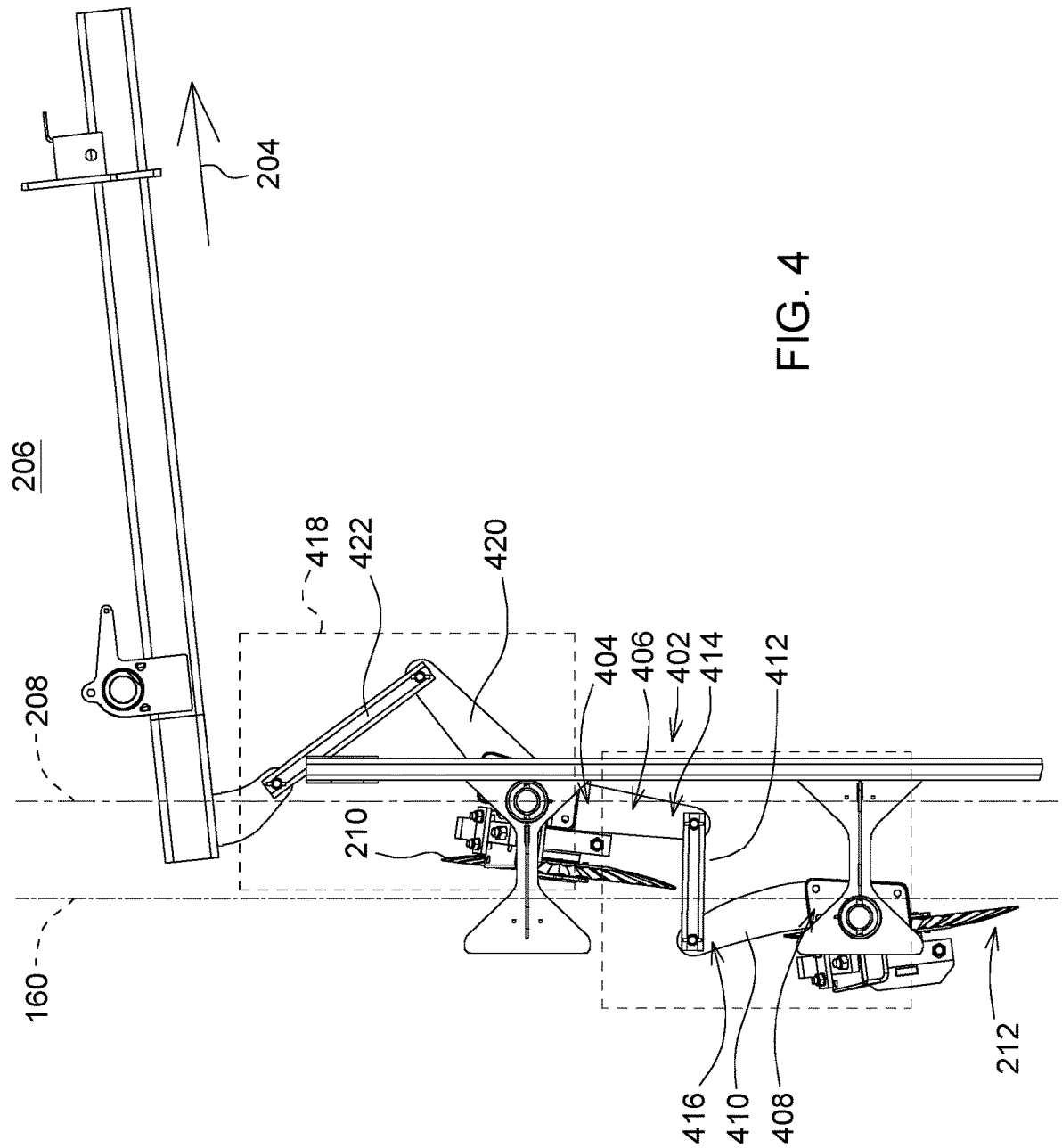

MIDDLE BREAKER FOR A TILLAGE IMPLEMENT

CROSS-REFERENCE TO RELATED APPLICATIONS

N/A

FIELD OF THE DISCLOSURE

The present disclosure relates to tillage implements, and in particular to a middle breaker.

BACKGROUND

Agricultural implements and machines, such as various plows, tillers, rippers, seeders, nutrient applicators, etc., are used to work soil of field crops. Tillage and other agricultural implements can perform a variety of tasks, such as breaking up tough ground, injecting nutrients into the ground, and leveling the ground. Such implements are commonly towed behind work vehicles, such as tractors, and can be outfitted with a variety of ground-engaging tools, such as shanks, discs, harrowing tools and finishing tools, depending on the ground preparation operation being carried out.

The ability to efficiently and effectively conduct ground preparation operations is highly affected by the ground conditions, such as the wetness, the amount of crop residue, and the general composition of the ground. One issue is establishing and maintaining the desired engagement of the tools with the ground. This could be in terms of the proper orientation and alignment with the direction of travel of the implement, the proper ground following and penetration to achieve the desired ground preparation, achieving a consistent orientation, or following and penetration with respect to the ground across the width of the implement transverse to the travel direction of the implement.

Modern tillage implements may have a central main frame and one or more wings supporting the tools in a prescribed pattern to achieve good ground working and residue flow over an extended swathe of field as the implement traverses the field. Some tillage implements, for example, have outer wings pivotally coupled to inner wings, which, in turn are pivotally connected at opposite sides of the main frame. The pivotal connections permit the wings to fold inward for transport of the implement on roadways. Arranging the various tools and attachments as needed for ground-working without interfering with folding of the implement may be challenging and may require operator intervention in the event any of the various components become entangled.

A common configuration of a tool placement pattern includes a simple array (i.e. a set number placed in rows and columns) of gang assemblies mirrored about a centerline of the tillage implement extending in the fore-aft direction. However, this mirrored symmetry of columns of gang assemblies about the centerline results in a discontinuity of ground material tillage in and around the central region of the tillage implement. For example, an area of untilled ground materials spanning a minimum four inches across the centerline is generally present in common configurations of tool placement Alternatively, gang assemblies may be placed in a staggered array in an offset tandem configuration whereby the tillage of ground material may address the aforementioned discontinuity. However, this approach yields in a tillage implement that is longer in the fore-aft direction and/or wider in a lateral direction. This creates a number of issues regarding foldability, transport, and the placement of non-symmetric components throughout the tillage implement. The non-symmetry may cause uneven draft loads causing "dog tracking" or inconsistent cutout of ground material in the field. The following, in particular the middle breaker of the present disclosure, addresses these issues.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a tillage implement, and in particular, a middle breaker.

According to an aspect of the present disclosure, a tillage implement may have a frame member extending in a fore-aft direction of the implement. The frame member is pivotally connected in foldable configuration. The frame member may comprise a main frame section, a first wing section and a second wing section, where each wing section is pivotally connected at opposing lateral sides of the main frame section in the fore-aft direction. The frame member may also comprise a middle breaker including a first disc and a second disc coupled to the main frame section.

The first disc and the second disc may have a concave side facing towards the midline of the middle breaker.

The first disc may be positioned forward the second disc in the fore-aft direction. The first disc and second disc may also be positioned on opposite sides of the midline of the middle breaker.

The first disc and second disc may move ground material at least one of away from and towards the midline.

The first disc may also be operably coupled to the second disc such that movement of the first disc causes relative movement of the second disc. The first disc and the second disc may be acutely angled between zero and sixteen degrees relative to the midline.

The main frame also comprises a gang assembly. The gang assembly may be coupled to the middle breaker where the first disc, the second disc, or both discs move relative to the midline in response to a positioning of the gang assembly. Furthermore, the first disc and the second disc are positioned closer to the midline relative to the gang assembly.

In one embodiment, the midline of the middle breaker may extending in the fore-aft direction is offset from the centerline of the frame member extending in the fore-aft direction.

In another embodiment, the midline of the middle breaker may extending in the fore-aft direction coincides with the centerline of the frame member extending in the fore-aft direction.

In another embodiment, the middle breaker may be adjustable where the first disc is coupled to the second disc via three bar linkage. This three bar linkage may comprise a first portion of a first link coupled to the first disc, a first portion of a second link coupled to the second disc, and a third link coupled to a second portion of the first link and a second portion of the second link. The first disc and the second disc may be acutely angled between zero and sixteen degrees relative to the midline in response to the positioning of the first link or the second link.

In an alternative embodiment the main frame may also comprise a gang assembly, where the gang assembly is coupled to the middle breaker via a two-bar linkage. Here the first disc and the second disc may be acutely angled between zero and sixteen degrees relative to the midline of the middle breaker in response to the position of the gang assembly.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 4 is a detailed top view of an embodiment showing a portion of the tillage implement.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Various agricultural machines (e.g. seeders, sprayers, primary and secondary tillage implements, and so on) have very wide platforms for mounting various tools or material dispensing components for working crop fields. To allow for transport on roadways, the implements may be formed in sections, one or more of which are able to fold inward alongside or above a main frame of the implement, which has a controlled width or lateral dimension. The sections may be pivotally connected with respect to one another between an operational position, in which the "wing" frame sections are generally parallel with the main frame sections, and a transport position, in which the wing sections are folded up and/or over the main frame section. An implement may have as few as one main frame section and one wing section, or it may have several wing sections, such as multiple (e.g. inner and outer) wing sections on each side of the main frame section.

Figure 1:
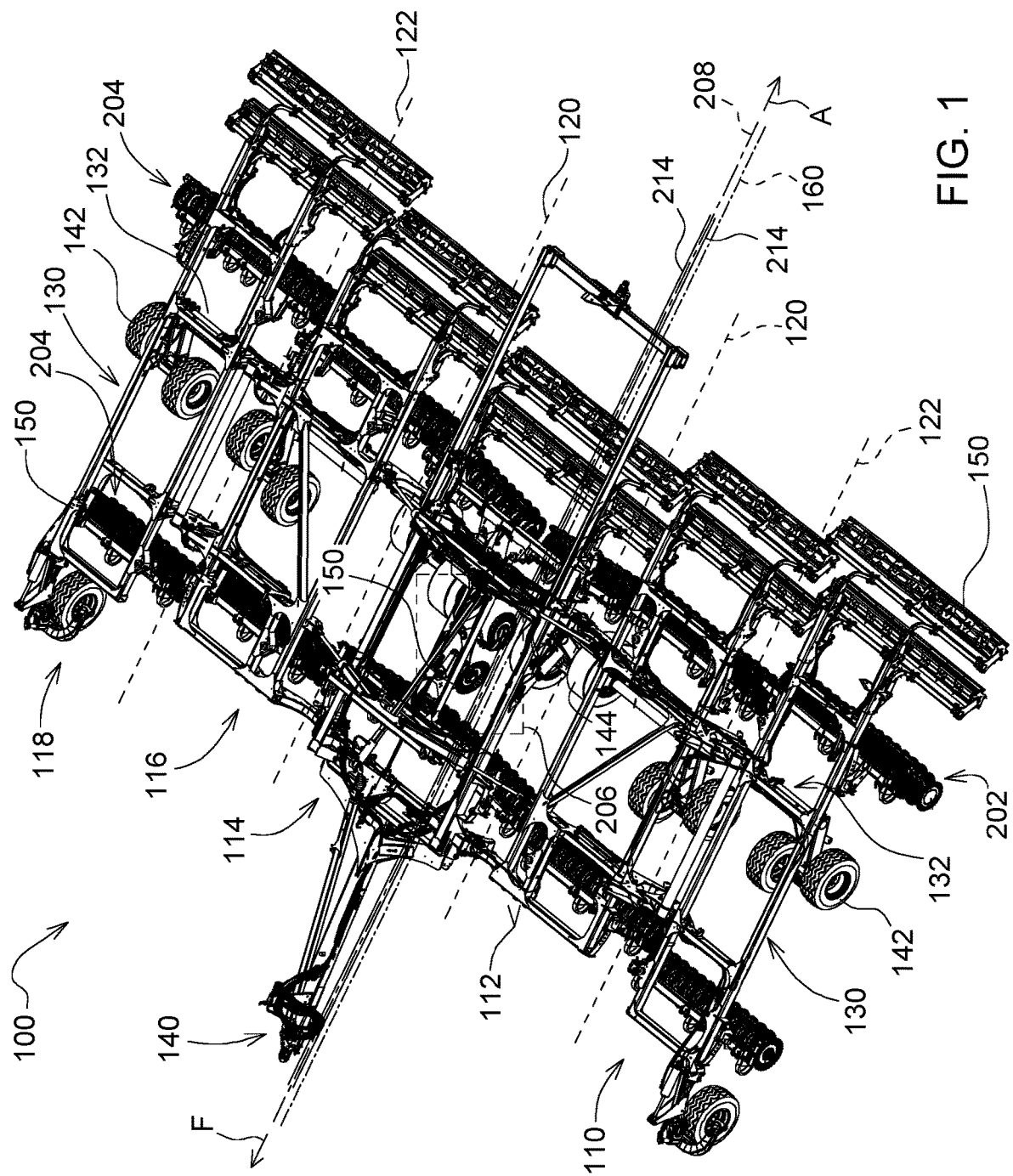
FIG. 1 is a perspective view of one embodiment of the tillage implement.

FIG. 1 illustrates one embodiment of a tillage implement 100 showing five frame sections, extending in the fore-aft direction (indicated by arrows and designated by letters F and A), which are pivotally coupled in a foldable configuration. Progressing from left to right, the frame sections include a first outer wing section 110, a first inner wing section 112, a main frame section 114, a second inner wing section 116, and a second outer wing section 118. The inner wing sections 112, 116 are pivotally coupled at opposing lateral sides of the main frame section 114 and may pivot with respect thereto about first and second inner hinge lines 120. The outer wing sections 110, 118 are pivotally coupled at the laterally outer sides of the inner wing sections 112, 116, respectively, and can pivot relative thereto about first and second outer hinge lines 122. Such a multi-section pivotally coupled design enables the tillage implement 100 to transition from the unfolded operational state to a folded state to facilitate storage and transport on highways.

The frame sections 110-118 each have a number of frame members, such as hollow metal or non-metal tubes or beams (e.g. 2×6 or 2×8 beams, or pairs of 2×2 beams). The frame members may be interconnected to provide a lattice-like framework to which an array of tillage tools and other components may be mounted. In the examples, the frame sections 110-118 include both laterally-spaced fore-aft frame members 130 and fore-aft spaced lateral frame members 132, which are bolted, welded, or otherwise interconnected in the manner illustrated. Please note that elements identified may not represent each and every element of that numeral identified in the drawing (e.g. laterally-spaced fore-aft frame members 130 may include more frame members than that which are identified).

The frame sections 110-118 may assume various other forms and may have other constructions in other embodiments, provided that the frame sections 110-118 enable the below-described tillage tools and attachments to be mounted at selected locations across the tillage implement 100. The tillage implement 100 may also include various other components mounted to the frame section 110-118 at selected locations to facilitate towing of the tillage implement 100, to automate movement of the tillage implement 100 between folded and unfolded states, or to provide other functions. Such components may include a tow hitch 140 projecting from the main frame section 114 in forward direction (marked by an arrow designated with the letter F), a number of ground-engaging wheels 142, and an actuation system 144 (e.g. controllers, hydraulic cylinders, and associated plumbing) for transitioning the tillage implement 100 between its unfolded operational state and its folded transport state. The aft direction is marked by an arrow and a letter designated by the letter A.

The tillage implement 100 is engaged with a plurality of ground-engaging tillage tools 150. The tillage tools 150 (e.g. discs 202 and gang assemblies 204) may be mounted to the frame sections 110-118 in a strategically-chosen spatial formation or array, with each tool mounted at a particular location dictated by a prescribed tool placement pattern. Adherence to the prescribed tool placement pattern may directly affect the performance of the tillage implement 100. Gang assemblies 204 comprise of a plurality of individually mounted, frame supported, concave, rotating, laterally extending rows of discs 202 with the working depth of the discs controlled by one or more ground-engaging wheels 142, or the actuation systems 144. These discs 204 are best suited where a moldboard has difficulty penetrating such as sticky ground material; hard, dry ground material; hardpan and highly abrasive ground material where the cost of mold-board plow-bottom wear would be prohibitive; ground material containing heavy roots; peat land; and ground material where deep plowing from twelve to sixteen inches is desired. In one embodiment, a gang assembly 202 may have one to seven discs 204 which cut seven to twelve inches of width per disc. The discs for each gang assembly may be tilted by different angular amounts based on their positioning in the fore-aft direction on the tillage implement 100. That is, while the discs 202 for gang assemblies 204 transverse to the fore-aft direction may be tilted by the same angle, the discs used for successive gang assemblies in the fore-aft direction may be different. Additionally, gang assemblies 204 may mirror one another across the centerline 208 of the tillage implement 100.

The inclusion of a middle breaker 206 resolves the discontinuity of ground material (designated by dual lines 214) in and around the central region of the tillage implement 100. The middle breaker 206 tills or otherwise works the previously untilled central region producing a continuous till surface across the entire width of the tillage implement 100.

Figure 2:
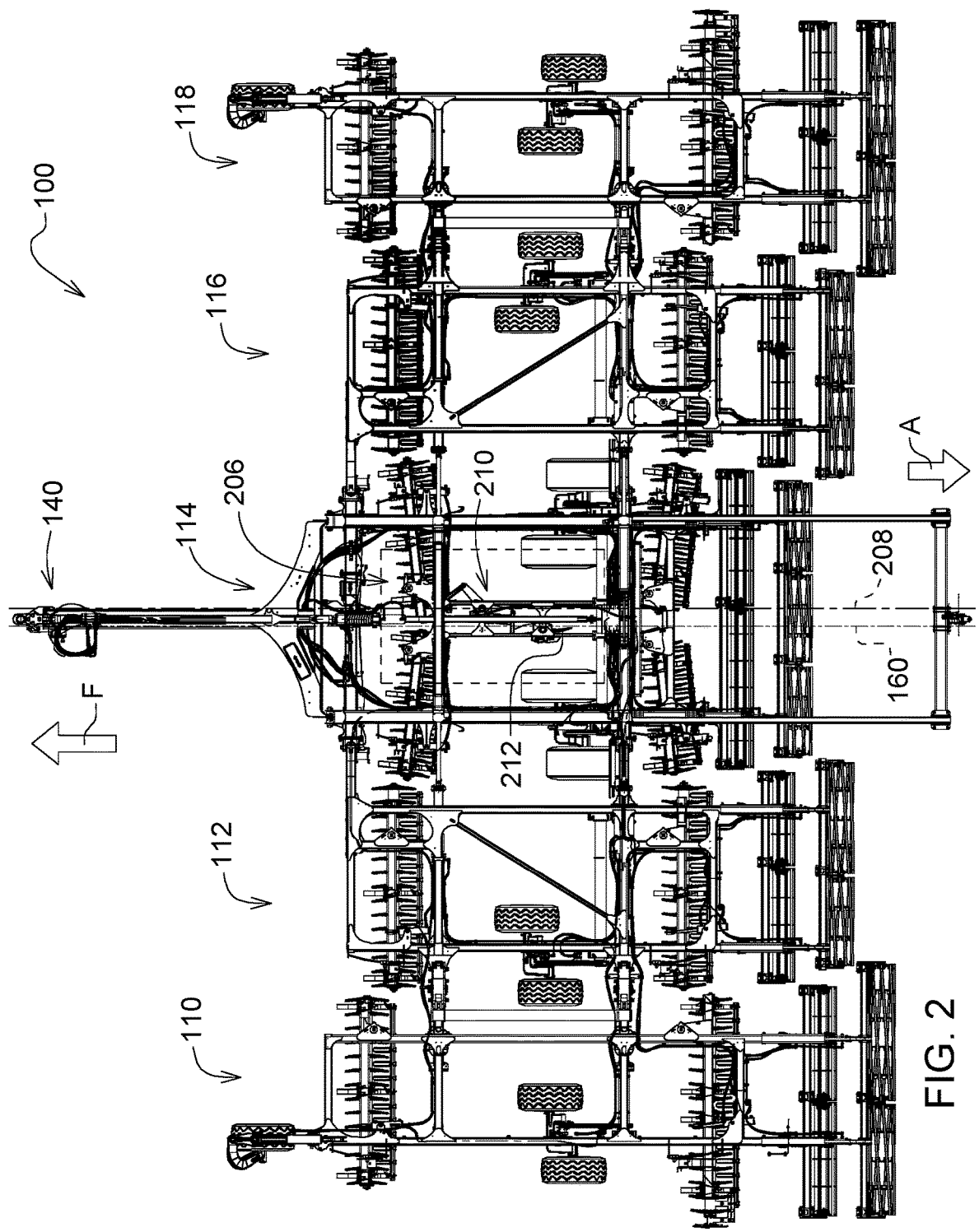
FIG. 2 is a top view of an embodiment of the tillage implement.
Figure 3:
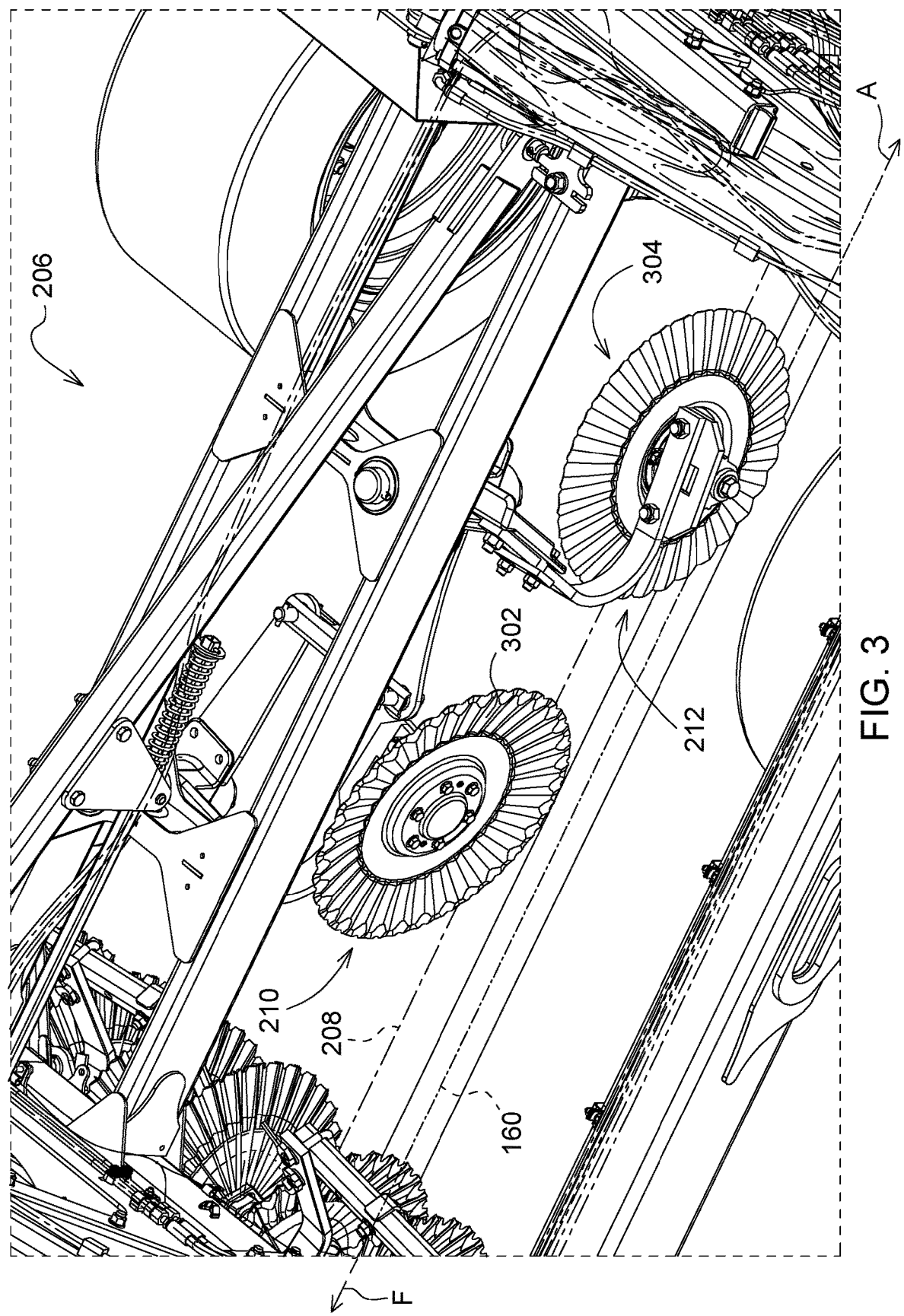
FIG. 3 is a detailed perspective view of an embodiment of the tillage implement.

Now turning to the top view in FIG. 2, in one embodiment, the tillage implement having frame members 110-118 extending in a fore-aft direction of the implement, the frame member pivotally connected in a foldable configuration, the frame member comprises a main frame section 114; a first wing section 110, 112 and a second wing section 116, 118, each being pivotally connected at opposing lateral sides of the main frame section 114 in the fore-aft direction; and a middle breaker 206 (as identified by the dotted rectangle). As shown in greater detail in FIG. 3, in one embodiment, the middle breaker 206 may include a first disc coupled 210 to the main frame section 114, the first disc 210 laterally offset from a midline of the middle breaker 160 located in the mainframe section 114 extending in the fore-aft direction, the first disc 210 having a concave side 302 (as shown in FIG. 3) facing towards the midline 160, and a second disc 212 coupled to the main frame section 114, laterally offset from the midline 160, the second disc 212 having a concave side 304 (as shown in FIG. 3) facing towards the midline 160. The first disc 210 and the second disc 212 may also be positioned on opposite sides of midline of the middle breaker 160. The midline of the middle breaker 160 may be slightly offset from the centerline 208 of the tillage implement 100 (shown in FIGS. 1, 2, 4, and 6), although generally positioned around the center of the mainframe section 114. The offset accounts for the point at which the ground material is tilled and thrown from the discs (210, 212) and the dimensional attributes of the linkage 402 (discussed below) coupling the first disc 210 to the second disc 212. Alternatively, the midline 160 of the middle breaker 206 may coincide with the centerline 208 of the tillage implement 100.

Furthermore, the first disc 210 and the second disc 212 may move ground material at least one away from and towards the midline 160, in opposing directions, thereby advantageously addressing issues of untilled ground material along the centerline 208 without the issues presented by staggered gang assemblies in an offset tandem configuration, as discussed above. The first disc 210 and the second disc 212 may further move ground material across the midline of the middle breaker 160. The direction where the first disc 210 and the second disc 212 move ground material is dependent upon the angle and positioning of each respective disc wherein the direction the ground material is thrown addresses the issue of discontinuity of ground material tillage in and around the central region of the tillage implement 100.

Now turning to FIG. 3, a detailed isometric view of the middle breaker 206, the first disc 210 may be positioned forward the second disc 212 in the fore-aft direction. The first disc 210 having a concave side 302 facing towards the midline 160 of the middle breaker 206 may be positioned forward the second disc 212 which has a concave side 304 facing towards the midline 160. The concave sides 302, 304 of the discs 210, 212 till ground material towards the first inner wing section 112 and then towards the second inner wing section 116 respectively, as the tillage implement 100 (shown in FIG. 1) is pulled forward. By throwing the ground material back and forth in this manner, ground material clumps are broken up, thereby resulting in less irregularity in the finished ground surface and a more level tilled soil surface.

Figure 5B:
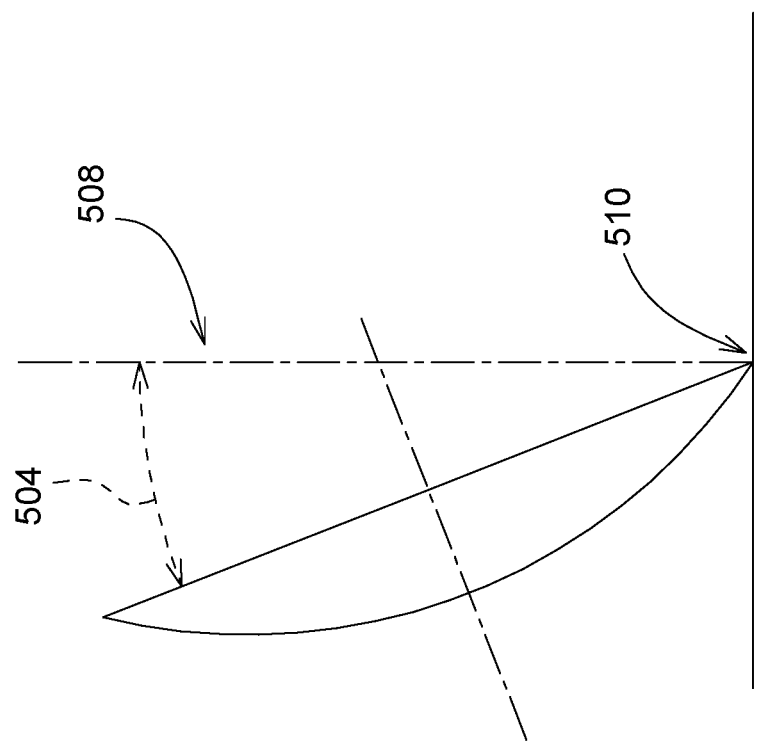
FIG. 5B is an explanatory pictorial of vertical disc angle.
Figure 5A:
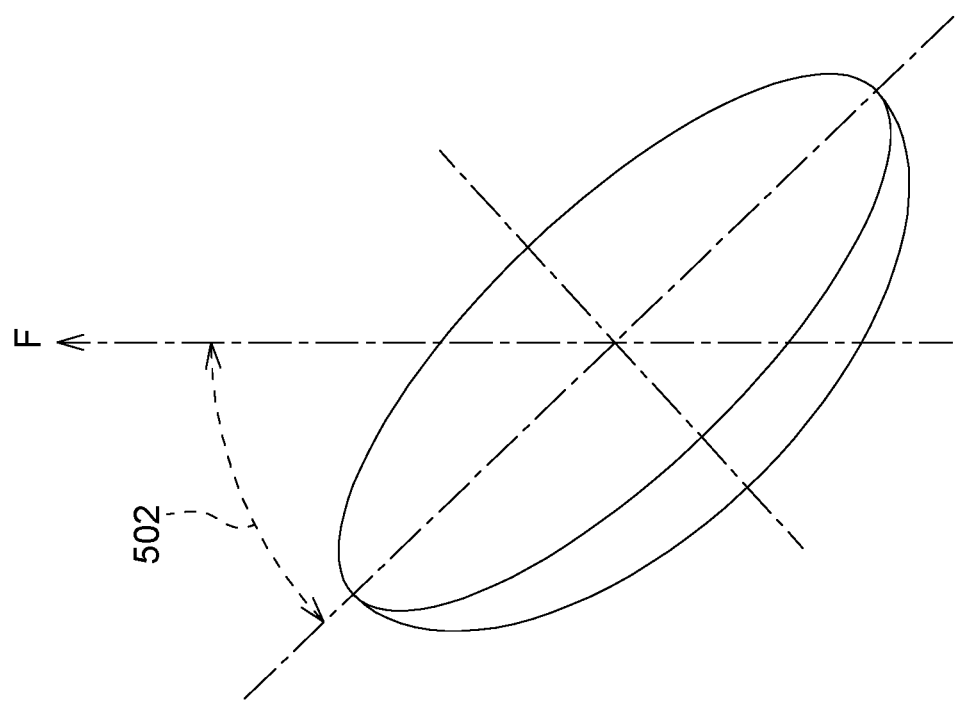
FIG. 5A is an explanatory pictorial of horizontal disc angle.

Now turning to FIG. 4, a detailed top view of the middle breaker 206 is shown. The middle breaker 206 may further be adjustable. Adjustability of the middle breaker 206 refers to the adjustment of the first disc 210 and the second disc 212. The discs (210, 212) may comprise of adjustment of the horizontal disc angle 502 (shown in FIG. 5A) and the vertical tilt angle 504 (shown in FIG. 5B) to obtain optimum disc operation in different soil conditions. As shown in FIG. 5A, horizontal disc angles may be 0 to 47 degrees from the direction of travel (indicated by an arrow and designated by the letter F) for discs other than those found in the middle breaker 206. However, the angle may vary depending upon the soil tilled. Reducing the angle, a less abrupt setting, increases disc rotation with respect to ground speed, and reduces the tendency of the plow to overcut due to pressure on the backside of the disc. Increasing the disc angle improves disc penetration by creating a more abrupt setting. The vertical tilt angle, as shown in FIG. 5B, normally ranges from 15 to 25 degrees. Increasing the vertical tilt angle 504 (farther from the vertical 508) improves disc penetration in heavy, sticky ground materials that have a tendency to roll under the cutting edge. The vertical 508 is the directional axis perpendicular to the ground line 510. Decreasing the vertical tilt angle 504 (closer to the vertical 508) improves disc performance in loose or brittle soils. Setting discs in the steeper position puts greater ground material pressure on the disc, resulting in faster disc rotation, greater soil pulverization, and better cutting and coverage of ground material debris. In order to achieve the adjustability in angles (including but not limited to horizontal disc angle 502 and tilt angle 504), the middle breaker may be coupled to an individual actuation system 144, or ground-engaging wheels 142 with height adjustment. Returning to FIG. 4, the first disc 210 is operably coupled to the second disc 212 such that movement of the first disc 210 may cause relative movement of the second disc 212. In one embodiment, the first disc 210 is coupled to the second disc 212 via a three bar linkage 402 (designated by the dotted rectangle) comprising a first portion 404 of a first link 406 coupled to the first disc 210; a first portion 408 of a second link 410 coupled to the second disc 212, and a third link 412 coupled to a second portion 414 of the first link 406 and a second portion 416 of the second link 410.

The first disc 210 and the second disc 212 may be acutely angled between zero and sixteen degrees relative to the midline of middle breaker 160. In other words, the first disc 210 and the second disc 212 may comprise a horizontal disc angle 502 between zero and sixteen degrees. The configuration shown allows for the first disc 210 and the second disc 212 to be angled the same relative to the midline of the middle breaker 160 (i.e. a mirror image of each other) whereby a relatively equal amount of ground material is thrown in opposite directions resulting in a more evenly tilled ground material surface (i.e. a uniform center soil profile).

Furthermore, the main frame section 114 may further comprise a gang assembly 204 (indicated by the arrow) where the gang assembly is 204 coupled to the middle breaker 206. This embodiment is adjustable, wherein the first disc 210 and second disc 212 move relative to the midline of the middle breaker 160 in response to a positioning of the gang assembly 204. Note, that gang assembly 204 is representative of one or more gang assemblies. In addition, the first disc 210 and second disc 212 may be positioned closer to the midline of the middle breaker 160 relative to the gang assembly 204. In a more detailed embodiment, the gang assembly 204 may be coupled to the middle breaker 206 via a two-bar linkage 418 whereby the first disc 210 and the second disc 212 are acutely angled between zero and sixteen degrees relative to the midline of the middle breaker 160 in response to a positioning of the gang assembly 204. The two bar linkage 418 comprises a fourth link 420 coupled to a fifth link 422, wherein the fourth link 420 is coupled to the first disc 210 on one end and the fifth link 422 on the other end, and the fifth link 422 is coupled to a gang assembly 204 on one end and the fourth link 420 on the other end. The two-bar linkage 418 may be planar, that is its motion may be confined to a plane. Similarly, the three-bar linkage 402 described above may also be planar. Coupling the middle breaker 206 to the gang assembly advantageously provides the ability to angle the discs 210, 212 in correlation with the angle of a respective disc 202 on the respective gang assembly 204, whereby providing continuity of the ground material tilled without the extra space requirements, complexity, weight or costs being added for additional actuation systems 144 to the tillage implement 100. That is, coupling the middle breaker 206 or a disc (210, 212) of the middle breaker to a respective gang assembly 204 eliminates the need for its own actuation system. For example, each pair of discs gangs on the frame sections 110-118 on opposing sides of the midline of the middle breaker 160 may be actuated using a single actuator. Alternatively, the tillage implement may have an actuator assembly 216 to each frame section 110-118 to raise and lower both of the associated disc gangs simultaneously. This not only reduces part-count, cost and weight, but it also ensures that both disc gangs in each pair are positioned uniformly with respect to the frame, and thereby the ground (i.e. penetration depth), or in other words "leveled" with respect to one another. It should be noted that, if desired, the disc gangs 204 may be programmed differently so that the actuator assembly 216 may position the associated disc gangs at different heights (or penetration depths). Separate actuators for each disc gang would add significant space, cost, and weight. Furthermore, although the discs on the middle breaker 206 need not necessarily match the gang assembly discs, the horizontal disc angle 502 and the vertical disc angle 504 for the respective discs are substantially close in angle. The similarity in angles advantageously yields relatively uniform, level, similar clod size, similar soil/residue mixture, and similar soil color in the area soiled by the middle portion of the tillage implement relative to the rest of the implement.

Furthermore, symmetry of ground engaging tillage tools 150 affects the transverse pulling of the tillage implement 100 during movement. Having an equal number of discs 202 on opposite sides of the centerline 208 of the tillage implement 100 mitigates issues of transverse pulling. Mirroring the angling of discs 202 on opposite sides of the centerline 208 is preferable wherein the number of discs tilted in one direction (e.g. in the first outer wing section 110) is about equal to the number of blades tilted in the opposite direction (e.g. in the second outer wing section 118).

Figure 6:
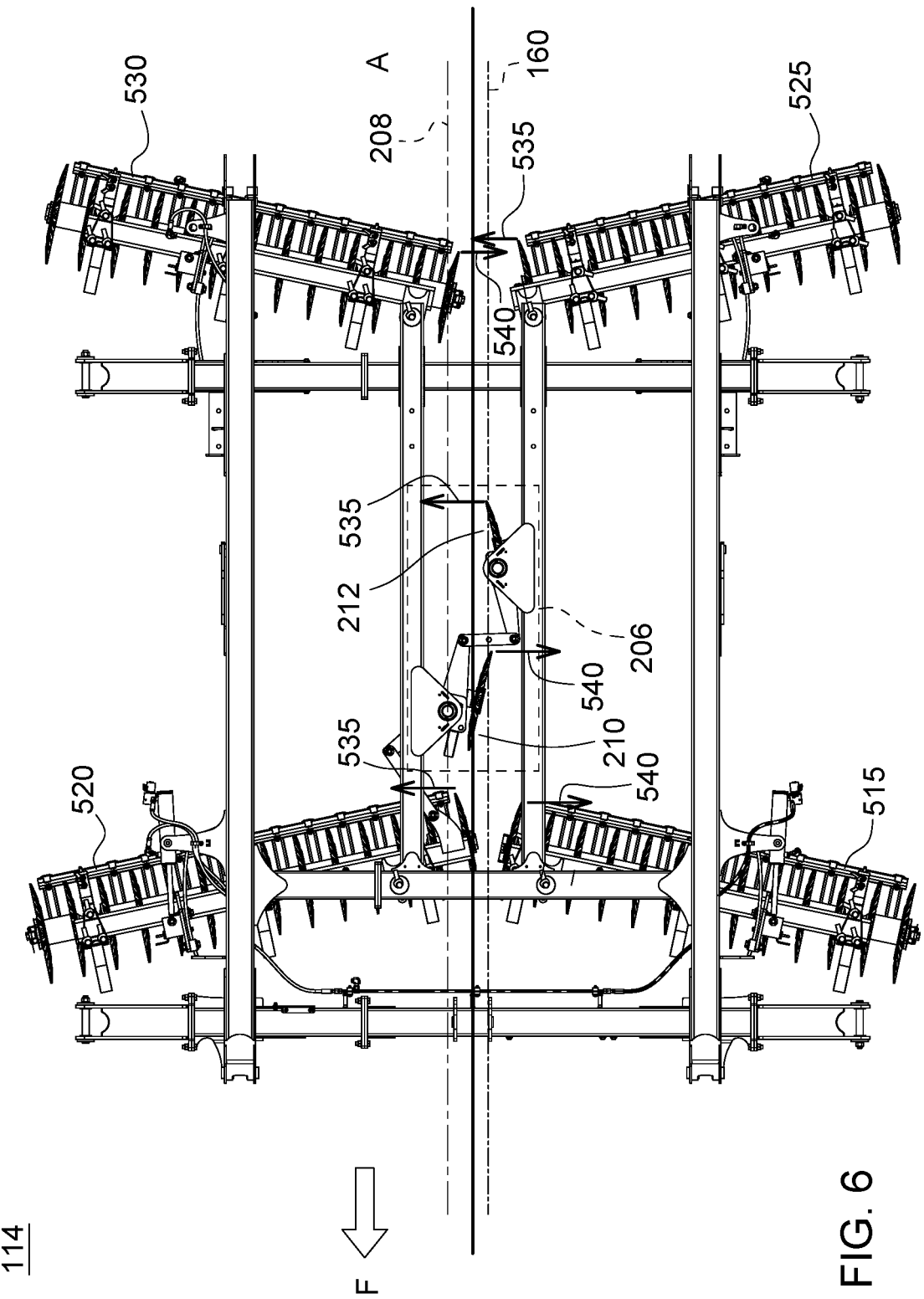
FIG. 6 is a detailed top view of the embodiment shown in FIG. 1, showing a portion of the tillage implement with arrows indicating where ground soil is thrown.

Now turning to FIG. 6, a detailed top view of the tillage implement 100 demonstrating the positions of the gang assemblies 204 and the middle breaker 206 relative to the mainframe section 114 is shown. In this embodiment, the midline 160 of the middle breaker 206 is positioned slightly offset and runs parallel with the centerline 208 of the tillage implement 100. In an alternative embodiment, the midline 160 may coincide with the centerline 208. The centerline 208 and the midline 160 run in the fore-aft direction as indicated by the arrow and designated by the letters F and A. The mainframe section 114 comprises four gang assemblies 204; a first gang assembly 515 positioned in the fore direction on the left side of the midline 160 (when facing the forward direction); a second gang assembly 520 positioned in the aft direction on the left side of the midline 160; a third gang assembly 525 positioned in the fore direction on the right side of the midline 160; and fourth gang assembly 530 positioned in the fore direction on the right side of the midline 160. The discs 202 of the second gang assembly 520 and the discs 202 of the third gang assembly 525 are angled similarly to the second disc 212 of the middle breaker 206, moving ground material in the same direction as indicated by the first set of arrows 535. On the contrary, the discs 202 of the first gang assembly 515 and the discs 202 of the fourth gang assembly 530 are angled similarly to the first disc 210, moving ground material in the same direction as indicated by the second set of arrows 540.

While the above describes example embodiments of the present disclosure, these descriptions should not be viewed in a restrictive or limiting sense. Rather, there are several variations and modifications which may be made without departing from the scope of the appended claims.

What is claimed is:

1. A tillage implement having a frame member extending in a fore-aft direction of the implement, the frame member pivotally connected in a foldable configuration, the frame member comprising:
   a main frame section;
   a first wing section and a second wing section, each being pivotally connected at opposing lateral side of the main frame section in the fore-aft direction; and
   a middle breaker including a first disc coupled to the main frame section, the first disc laterally offset from a midline of the middle breaker extending in the fore-aft direction, the first disc having a concave side facing towards the midline, and a second disc coupled to the main frame section, the second disc laterally offset from the midline of the middle breaker, the second disc having a concave side facing towards the midline;
   wherein the middle breaker is adjustable, the first disc operably coupled to the second disc such that movement of the first disc causes relative movement of the second disc.

2. The tillage implement of claim 1, wherein the first disc is positioned forward the second disc in the fore-aft direction.

3. The tillage implement of claim 1, wherein the first disc and the second disc are positioned on opposite sides of the midline.

4. The tillage implement of claim 1, wherein the first disc and the second disc move ground material at least one of away from and towards the midline.

5. The tillage implement of claim 1,
wherein the first disc and the second disc are acutely angled between zero and sixteen degrees relative to the midline.

6. The tillage implement of claim 1,
wherein the tillage implement further comprises a gang assembly, the gang assembly coupled to the middle breaker whereby at least one of the first disc and the second disc move relative to the midline in response to a positioning of the gang assembly.

7. The tillage implement of claim 6, wherein the first disc and the second disc are positioned closer to the midline relative to the gang assembly.

8. The tillage implement of claim 1, wherein the midline of the middle breaker extending the fore-aft direction is offset from a centerline of the frame member extending in the fore-aft direction.

9. The tillage implement of claim 1, wherein the midline of the middle breaker extending in the fore-aft direction coincides with a centerline of the frame member extending in the fore-aft direction.

10. A middle breaker for a tillage implement comprising a frame member extending in a fore-aft direction, the frame member comprising a first wing section, a main frame section, and a second wing section, the middle breaker comprising:
a first disc coupled to the main frame section, laterally offset from a midline of the middle breaker extending in the fore-aft direction of the main frame section, the first disc having a concave side facing towards the midline; and
a second disc coupled to the main frame section, laterally offset from the midline of the middle breaker, the second disc having a concave side facing towards the midline;
wherein the middle breaker is adjustable, and
wherein the first disc is coupled to the second disc via a three bar linkage comprising:
a first portion of a first link coupled to the first disc,
a first portion of a second link coupled to the second disc, and
a third link coupled to a second portion of the first link and a second portion of a the second link.

11. The middle breaker of claim 10, wherein the first disc is positioned forward the second disc in the fore-aft direction.

12. The middle breaker of claim 10,
wherein the first disc and the second disc are positioned on opposite sides of the midline.

13. The middle breaker of claim 10, wherein the first disc and the second disc move ground material at least one of away from and towards the midline.

14. The middle breaker of claim 10, wherein the first disc and the second disc are acutely angled between zero and sixteen degrees relative to the midline in response to a positioning of at least one of the first link and the second link.

15. The middle breaker of claim 10,
wherein the tillage implement further comprises a gang assembly, the gang assembly coupled to the middle breaker via a two-bar linkage whereby at least one of the first disc and the second disc are acutely angled between zero and sixteen degrees relative to a centerline in response to a positioning of the gang assembly.

16. The middle breaker of claim 15, wherein the first disc and the second disc are positioned closer to the midline relative to the gang assembly.

17. The tillage implement of claim 10, wherein the midline of the middle breaker extending in the fore-aft direction is offset from a centerline of the frame member extending in the fore-aft direction.

18. The tillage implement of claim 10, wherein the midline of the middle breaker extending the fore-aft direction coincides with a centerline of the frame member extending in the fore-aft direction.

* * * * *